US010333462B2

(12) United States Patent
Shr et al.

(10) Patent No.: US 10,333,462 B2
(45) Date of Patent: Jun. 25, 2019

(54) MEASURING APPARATUS FOR SOLAR CELL

(71) Applicant: Industrial Technology Research Institute, Hsinchu (TW)

(72) Inventors: Ren-Chin Shr, Hsinchu (TW);
Yean-San Long, Hsinchu (TW);
En-Yun Wang, New Taipei (TW);
Min-An Tsai, Yunlin County (TW);
Hung-Sen Wu, Taoyuan (TW);
Teng-Chun Wu, Kinmen County (TW);
Cho-Fan Hsieh, Yilan County (TW);
Chin Lien, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 283 days.

(21) Appl. No.: 15/382,739

(22) Filed: Dec. 19, 2016

(65) Prior Publication Data

US 2018/0123510 A1 May 3, 2018

(30) Foreign Application Priority Data

Nov. 3, 2016 (TW) .............................. 105135724 A

(51) Int. Cl.
*H02S 50/10* (2014.01)
(52) U.S. Cl.
CPC .................................. *H02S 50/10* (2014.12)
(58) Field of Classification Search
CPC ....................... G01R 31/31924; G01R 31/002;
G01R 31/26; G01R 31/40; G01R 31/42;
(Continued)

(56) References Cited

U.S. PATENT DOCUMENTS 4,129,823 A 12/1978 Rosinski et al.
4,163,194 A 7/1979 Ross
(Continued)

FOREIGN PATENT DOCUMENTS

CN 102231594 11/2011
CN 102788944 11/2012
(Continued)

OTHER PUBLICATIONS

Takashi Fuyuki et al., "Photographic surveying of minority carrier diffusion length in polycrystalline silicon solar cells by electroluminescence", Applied Physics Letters, 2005.
(Continued)

*Primary Examiner* — Tung X Nguyen
*Assistant Examiner* — Robert P Alejnikov, Jr.
(74) *Attorney, Agent, or Firm* — JCIPRNET

(57) ABSTRACT

A measuring apparatus for solar cell is provided, which is configured to measure a solar cell to obtain a characteristic curve thereof. The measuring apparatus includes a signal measurement control circuit and a signal transmitting control circuit. The signal measurement control circuit is configured to output at least one control signal for controlling a resistance circuit thereof to provide a measurement loading. The signal transmitting control circuit includes at least one path separating circuit, each path separating circuit is configured to provide at least two signal transmitting paths with different signal transmitting directions. The signal measurement control circuit outputs the control signal to the resistance circuit by using the signal transmitting control circuit, so that the resistance circuit can be controlled to provide the measurement loading.

17 Claims, 8 Drawing Sheets

(58) Field of Classification Search
CPC .......... F21S 8/006; H01L 22/00; H01L 31/04; H01L 51/0031
USPC .................. 324/750.01, 537, 761.01
See application file for complete search history.

(56) References Cited

U.S. PATENT DOCUMENTS

| | | | |
|---|---|---|---|
| 4,205,265 A | 5/1980 | Staebler | |
| 4,528,503 A | 7/1985 | Cole | |
| 4,777,387 A | 10/1988 | Collins | |
| 5,945,839 A | 8/1999 | Hyvaerinen | |
| 6,127,746 A * | 10/2000 | Clemente | G01R 19/12 307/131 |
| 6,154,034 A | 11/2000 | Lovelady et al. | |
| 6,946,858 B2 | 9/2005 | Matsuyama | |
| 7,256,566 B2 | 8/2007 | Bhavaraju et al. | |
| 7,528,615 B2 | 5/2009 | Shimotomai | |
| 7,696,461 B2 | 4/2010 | Sinton et al. | |
| 8,224,598 B2 | 7/2012 | Wu et al. | |
| 9,176,182 B2 | 11/2015 | Hishikawa et al. | |
| 2004/0020529 A1 | 2/2004 | Schutt et al. | |
| 2009/0087722 A1* | 4/2009 | Sakabe | B60L 3/0046 429/61 |
| 2011/0241719 A1* | 10/2011 | Shr | H02S 50/10 324/761.01 |
| 2012/0188123 A1* | 7/2012 | Baba | G04C 10/02 342/357.63 |
| 2013/0106402 A1* | 5/2013 | Deboy | G01R 31/025 324/140 R |
| 2014/0354323 A1* | 12/2014 | Hishikawa | H02S 50/15 324/761.01 |

FOREIGN PATENT DOCUMENTS

| | | |
|---|---|---|
| CN | 104410363 | 3/2015 |
| CN | 104641551 | 5/2015 |
| DE | 102010050039 | 11/2011 |
| TW | 437084 | 5/2001 |
| TW | I322871 | 4/2010 |
| TW | I397708 | 6/2013 |
| TW | I413270 | 10/2013 |
| TW | 201505357 | 2/2015 |

OTHER PUBLICATIONS

"Office Action of Taiwan Counterpart Application," dated Jun. 29, 2017, p. 1-p. 6, in which the listed references were cited.

* cited by examiner

MEASURING APPARATUS FOR SOLAR CELL

CROSS-REFERENCE TO RELATED APPLICATION

This application claims the priority benefit of Taiwan application serial no. 105135724, filed on Nov. 3, 2016. The entirety of the above-mentioned patent application is hereby incorporated by reference herein and made a part of this specification.

BACKGROUND

Technical Field

The disclosure relates to a measuring apparatus, and particularly relates to a measuring apparatus for solar cell with a high acquisition rate.

Description of Related Art

To use solar cells to convert solar energy into electrical energy is now a mainstream of a renewable energy market. In order to develop more cost-effective and more efficient devices, new materials and new composite structure-designed devices are consecutively provided in recent years. For example, compared with c-Si solar cell products, III-V group alloy mixed substrates, organic thin-film materials, metallization-wrap-through (MWT) solar cells, heterojunction with intrinsic thin-layer (HIT) solar cells, etc., all have advantages of low cost, flexibility and high power-generating efficiency, etc.

However, regarding many devices with high photoelectric conversion efficiency, such as the HIT solar cell, etc., the multi-layer structure thereof leads to a subsequent capacitance effect problem. For example, when an I-V curve measurement is performed to a solar photoelectric device, if a material of a substrate or a device structure does not belong to a single material, the capacitance effect may result in a measurement error of the I-V curve at a point close to a maximum-power-point (MPP).

Methods for resolving the aforementioned capacitance effect include steady state light source irradiation, resistance parameter model establishment or dark current measurement, etc., though these measurement methods are not only time-consuming, procedures of the measurement operations are also complicated. Therefore, how to provide faster and more accurate measurement for such type of the solar photoelectric devices becomes a target of the technicians of the field.

SUMMARY

The disclosure is directed to a measuring apparatus for solar cell, which is adapted to quickly and accurately capture characteristic curve data of the solar cell.

The disclosure provides a measuring apparatus for solar cell to obtain a characteristic curve thereof. The measuring apparatus includes a signal measurement control circuit and a signal transmitting control circuit. The signal measurement control circuit is configured to output at least one control signal for controlling a resistance circuit thereof to provide a measurement loading. The signal transmitting control circuit includes at least one path separating circuit, each path separating circuit is configured to provide at least two signal transmitting paths, and signal transmitting directions of the at least two signal transmitting paths are different. The signal measurement control circuit outputs the control signal to the resistance circuit by using the signal transmitting control circuit.

According to the above description, the measuring apparatus for solar cell of the disclosure outputs the control signal to the resistance circuit by using the signal transmitting control circuit, and separates a charging and discharging path of the control signal by using the path separating circuit during the process of transmitting the control signal. In this way, the measurement loadings provided by the resistance circuit can be quickly switched, and an oscillation effect caused by factors of an inbuilt capacitance of the component, etc., during the switching operation is avoided, so as to quickly and accurately capture the characteristic curve of the solar cell.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAIL DESCRIPTION OF DISCLOSED EMBODIMENTS

Figure 1:
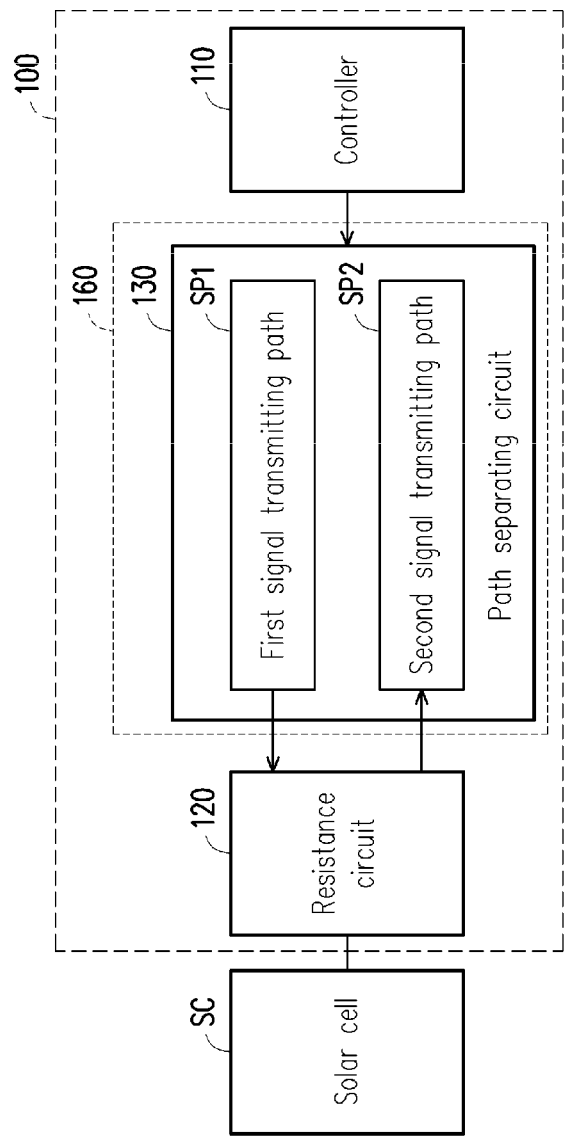
FIG. 1 is a schematic block diagram of a measuring apparatus for solar cell according to an embodiment of the disclosure.

FIG. 1 is a schematic block diagram of a measuring apparatus for solar cell according to an embodiment of the disclosure. Referring to FIG. 1, the measuring apparatus 100 of the present embodiment is configured to measure a solar cell SC to obtain a characteristic curve thereof. In the present embodiment, the characteristic curve is, for example, a current-voltage (I-V) characteristic curve of the solar cell SC. The measuring apparatus 100 includes a signal measurement control circuit and a signal transmitting control circuit. The signal measurement control circuit includes a controller 110 and a resistance circuit 120. The controller 110 is configured to output a control signal for controlling the resistance circuit 120 to provide a measurement loading required for measuring the solar cell SC. The signal transmitting control circuit is electrically connected between the signal measurement control circuit and the solar cell SC, and includes at least one path separating circuit 130, and each path separating circuit 130 is configured to provide at least two signal transmitting paths, and signal transmitting directions of the at least two signal transmitting paths are different. In this way, the signal measurement control circuit may output the control signal to the resistance circuit 120 by using the signal transmitting control circuit.

In the present embodiment, the controller 110 may output the control signal, and the control signal is transmitted to the resistance circuit 120 through the path separating circuit 130. Generally, when the control signal is changed from a low level to a high level, a current flows into the resistance circuit 120. Conversely, when the control signal is changed from the high level to the low level, the current may flow out from the resistance circuit 120. Therefore, the path separating circuit 130 of the present embodiment provides a first signal transmitting path SP1 and a second signal transmitting path SP2, such that the current may flow into the resistance circuit 120 through the first signal transmitting path SP1, and may flow out of the resistance circuit 120 through the second signal transmitting path SP2.

In the present embodiment, an impedance of the first signal transmitting path SP1 is smaller than an impedance of the second signal transmitting path SP2. Namely, the impedance when the current flows into the resistance circuit 120 is smaller than the impedance when the current flows out of the resistance circuit 120. However, the disclosure is not limited thereto, and in other embodiments, those skilled in the art may adjust the impedances of the first signal transmitting path SP1 and the second signal transmitting path SP2 according to an actual requirement.

Figure 2:
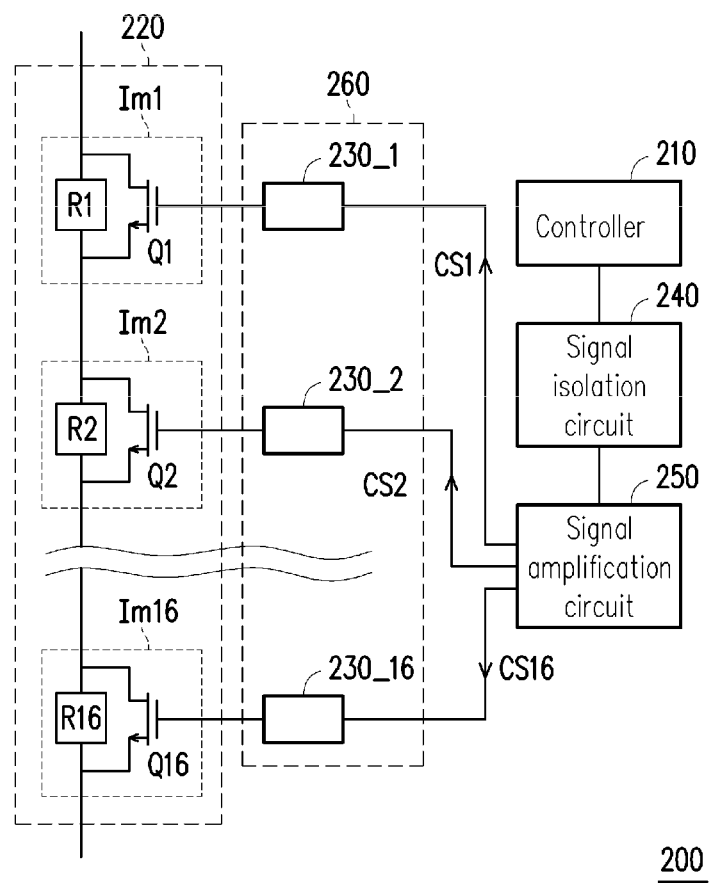
FIG. 2 is a block circuit diagram of a measuring apparatus for solar cell according to an embodiment of the disclosure.

FIG. 2 is a block circuit diagram of a measuring apparatus for solar cell according to an embodiment of the disclosure. Referring to FIG. 2, the signal measurement control circuit of the measuring apparatus 200 includes a controller 210, a signal isolation circuit 240, a signal amplification circuit 250 and a resistance circuit 220. The signal transmitting control circuit of the measuring apparatus 200 includes a plurality of path separating circuits 230_1 to 230_16. In the present embodiment, functions and configurations of the controller 210, the resistance circuit 220 and the path separating circuit 230_1 to 230_16 are similar to that of the similar components in the embodiment of FIG. 1, and detail thereof is not repeated.

In the present embodiment, the signal isolation circuit 240 is electrically connected between the controller 210 and the signal amplification circuit 250, and the signal amplification circuit 250 is electrically connected between the signal isolation circuit 240 and the signal transmitting control circuit.

In the present embodiment, the signal isolation circuit 240 is configured to respectively transmit control signals CS1-CS16 output by the controller 210 to the path separating circuits 230_1 to 230_16. Moreover, the signal isolation circuit 240 is further configured to isolate a reverse current flowing from the signal transmitting control circuit to the controller 210, so as to prevent the reverse current from damaging the controller 210. Those skilled in the art may understand a detailed implementation method of the signal isolation circuit 240 used for achieving the aforementioned effects, and detail thereof is not repeated.

It should be noted that the controller 210 of the present embodiment is to output 16 control signals to control the resistance circuit 220 to provide a signal measurement loading, though the disclosure is not limited thereto, and in other embodiments, the controller 210 may also output other number of the control signals according to an actual requirement (for example, a specification of the controller 210, etc.), and control the resistance circuit 220 to provide the signal measurement loading through other number of the path separating circuits.

In the present embodiment, the signal amplification circuit 250 is configured to amplify the control signals CS1 to CS16 output by the controller 210. For example, a voltage level of the control signals CS1 to CS16 output by the controller 210 is 3 volts, though in the present embodiment, the voltage level required for controlling the resistance circuit 220 is 12 to 15 volts. Therefore, the signal amplification circuit 250 may amplify the voltage level of the control signals CS1 to CS16 to 12 to 15 volts. Those skilled in the art may understand a detailed implementation method of the signal amplification circuit 250 used for achieving the aforementioned effects, and detail thereof is not repeated. Moreover, in other embodiments, the measuring apparatus 200 may also include the signal amplification circuit 250 with other magnification factor, or does not include the signal amplification circuit 250, which is not limited by the disclosure.

In the present embodiment, the resistance circuit 220 includes a plurality of impedance circuits Im1 to Im16. The impedance circuits Im1 to Im16 respectively include resistors R1 to R16 and transistor switches Q1 to Q16, where the resistors R1 to R16 are respectively connected to the transistor switches Q1 to Q16 in parallel. Control terminals of the transistor switches Q1 to Q16 are electrically connected to the path separating circuits 230_1 to 230_16 in the signal transmitting control circuit respectively, and the transistor switches Q1 to Q16 determine whether to provide the measurement loadings through the resistors connected in parallel thereto according to the control signals CS1 to CS16 provided by the controller 210.

Taking the impedance circuit Im1 as an example, the impedance circuit Im1 includes the resistor R1 and the transistor switch Q1 connected in parallel to each other, where the control terminal of the transistor switch Q1 (for example, a gate of the transistor) is electrically connected to the path separating circuit 230_1. The control signal CS1 provided by the controller 210 is transmitted to the control terminal of the transistor switch Q1 through the path separating circuit 230_1, and when a gate source voltage of the transistor switch Q1 is greater than a threshold voltage of the transistor switch Q1, the transistor switch Q1 is turned on to short the resistor R1. In other words, the transistor switch Q1 may determine whether to provide the measurement loading through the resistor R1 according to the control signal CS1. Similarly, in the impedance circuits Im2 to Im16, the transistor switches Q2 to Q16 may determine whether to provide the measurement loadings through the resistors R2 to R16 according to the control signals CS2 to CS16.

In this way, when the controller 210 outputs the control signals CS1 to CS16 of different combinations, the resistance circuit 220 may provide different measurement loadings required for measuring the solar cell SC in a specific frequency corresponding to the control signals CS1 to CS16 by shorting the resistors R1 to R16 of different combinations. It should be noted that the present embodiment, the impedance circuits Im1 to Im16 correspond to the path separating circuits 230_1 to 230_16 in a one-to-one manner, though the disclosure is not limited thereto.

In the present embodiment, the transistor switches Q1 to Q16 are, for example, metal-oxide-semiconductor field-effect transistors (MOSFET), SiC-MOSFET or insulated gate bipolar transistors (IGBT), though the disclosure is not limited thereto.

Particularly, when the I-V characteristic curve of the solar cell is measured, it often needs to quickly switch the measurement loadings, so that it is required to quickly and frequently turn on/off the transistor switches Q1 to Q16. Taking the transistor switch Q1 as an example, when an inbuilt capacitor exists between a gate and a source of the transistor switch Q1, a current flowing through the resistor R1 has an oscillation phenomenon, and the oscillation phenomenon is more obvious when a control terminal (i.e. the gate) of the transistor switch Q1 is discharged. Therefore, the path separating circuits 230_1 to 230_16 are set in the measuring apparatus 200 of the present embodiment to mitigate the aforementioned oscillation phenomenon.

In the present embodiment, the signal transmitting control circuit includes a plurality of the path separating circuits 230_1 to 230_16. In view of configuration, the path separating circuits 230_1 to 230_16 are connected to the impedance circuits Im1 to Im16 in the one-to-one manner. The path separating circuit 230_1 is taken as an example to describe the path separating circuit of the disclosure.

Figure 3:
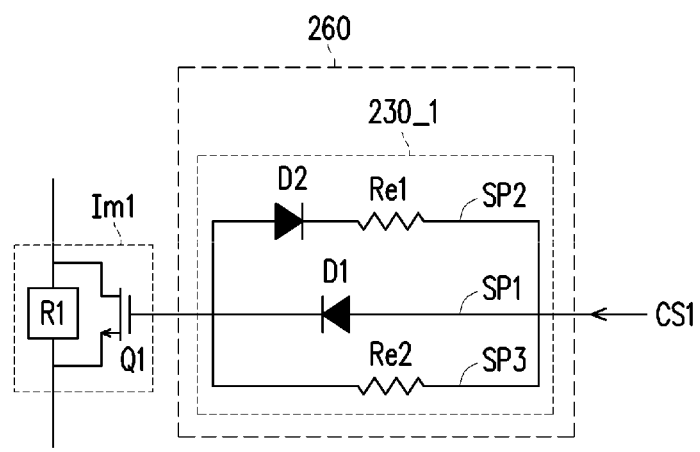
FIG. 3 is a block circuit diagram of a path separating circuit according to an embodiment of the disclosure.

FIG. 3 is a block circuit diagram of a path separating circuit according to an embodiment of the disclosure. Referring to FIG. 3, the path separating circuit 230_1 of the present embodiment provides a first signal transmitting path SP1, a second signal transmitting path SP2 and a third signal transmitting path SP3.

In the present embodiment, the first signal transmitting path SP1 includes a first diode D1, which is used for limiting a current from flowing into the impedance circuit Im1 of the resistance circuit 220. The second signal transmitting path SP2 includes a second diode D2 and a first resistor Re1, which is used for limiting a current from flowing out of the impedance circuit Im1 of the resistance circuit 220. A control terminal of the impedance circuit Im1 of the resistance circuit 220 is electrically connected to an output terminal of the first diode D1 and an input terminal of the second diode D2. Therefore, regarding the currents flowing into and out of the resistance circuit 220, an impedance of the first signal transmitting path SP1 is smaller than an impedance of the second signal transmitting path SP2.

It should be noted that when the gate of the transistor switch Q1 in the impedance circuit Im1 is discharged, the discharge is implemented through the second signal transmitting path SP2 including the first resistor Re1. In this way, a discharge rate of the gate of the transistor switch Q1 is slowed down, so as to mitigate the oscillation of the current flowing through the resistor R1 in case of discharging. On the other hand, when the gate of the transistor switch Q1 in the impedance circuit Im1 is charged, the charging is implemented through the first signal transmitting path SP1 without any resistor. In this way, the gate of the transistor switch Q1 can be quickly charged.

However, the commonly used diode (for example, a silicon diode) has a barrier voltage (for example, 0.7 volt), and if only the second signal transmitting path SP2 is provided to serve as the path for the current to flow out of the resistance circuit 220, the gate of the transistor switch Q1 cannot be sufficiently discharged.

Therefore, in the present embodiment, the path separating circuit 230_1 further provides the third signal transmitting path SP3 including a second resistor Re2, so as to provide another path for the current to flow out of the resistance circuit 220. Namely, in the present embodiment, the current flows out of the resistance circuit 220 through the second signal transmitting path SP2 and the third signal transmitting path SP3. It should be noted that a resistance of the second resistor Re2 is greater than a resistance of the first resistor Re1, so that regarding the currents flowing into and out of the resistance circuit 220, the impedance of the third signal transmitting path SP3 is greater than the impedance of the first signal transmitting path SP1 and the impedance of the second signal transmitting path SP2.

In another embodiment, the path separating circuit 230_1 may not include the third signal transmitting path SP3, but only provides the second signal transmitting path SP2 to serve as the path for the current to flow out of the resistance circuit 220. In still another embodiment, the path separating circuit 230_1 may further include a fourth signal transmitting path to provide another path for the current to flow out of the resistance circuit 220. In other words, the path separating circuit 230_1 of the embodiment of the disclosure at least includes the first signal transmitting path SP1 and the second signal transmitting path SP2, and those skilled in the art may add other current paths according to an actual requirement.

Figure 8:
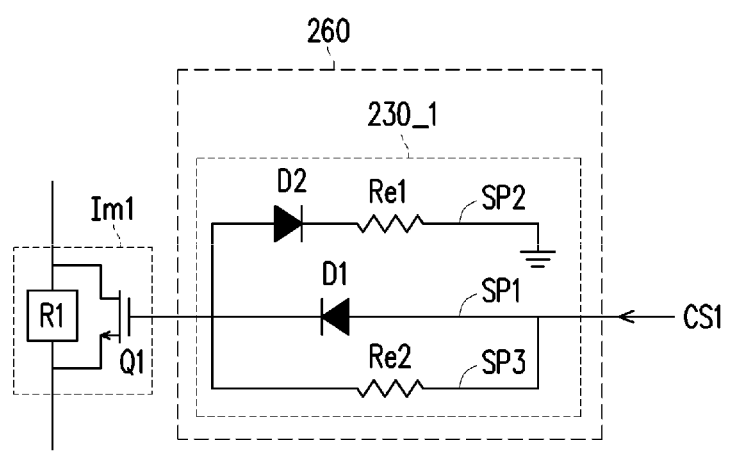
FIG. 8 is an equivalent circuit diagram of a solar cell according to an embodiment of the disclosure.

In the present embodiment, the first signal transmitting path SP1 and the second signal transmitting path SP2 are connected in parallel. However, the disclosure is not limited thereto. In other embodiments, the first signal transmitting path SP1 and the second signal transmitting path SP2 may not be connected in parallel with each other. For example, as shown in FIG. 8, an output terminal of the second diode D2 of the second signal transmitting path SP2 may not be electrically connected to an input terminal of the first diode D1, but is connected to the ground or other circuit.

In this way, through the measuring apparatus 200 of the embodiment of FIG. 2 and the path separating circuit 230_1 of the embodiment of FIG. 3, charging and discharging paths of the control terminal of the transistor switch Q1 can be separated, so as to simultaneously achieve fast switch switching and avoid oscillation of the current flowing through the resistor R1.

Figure 4:
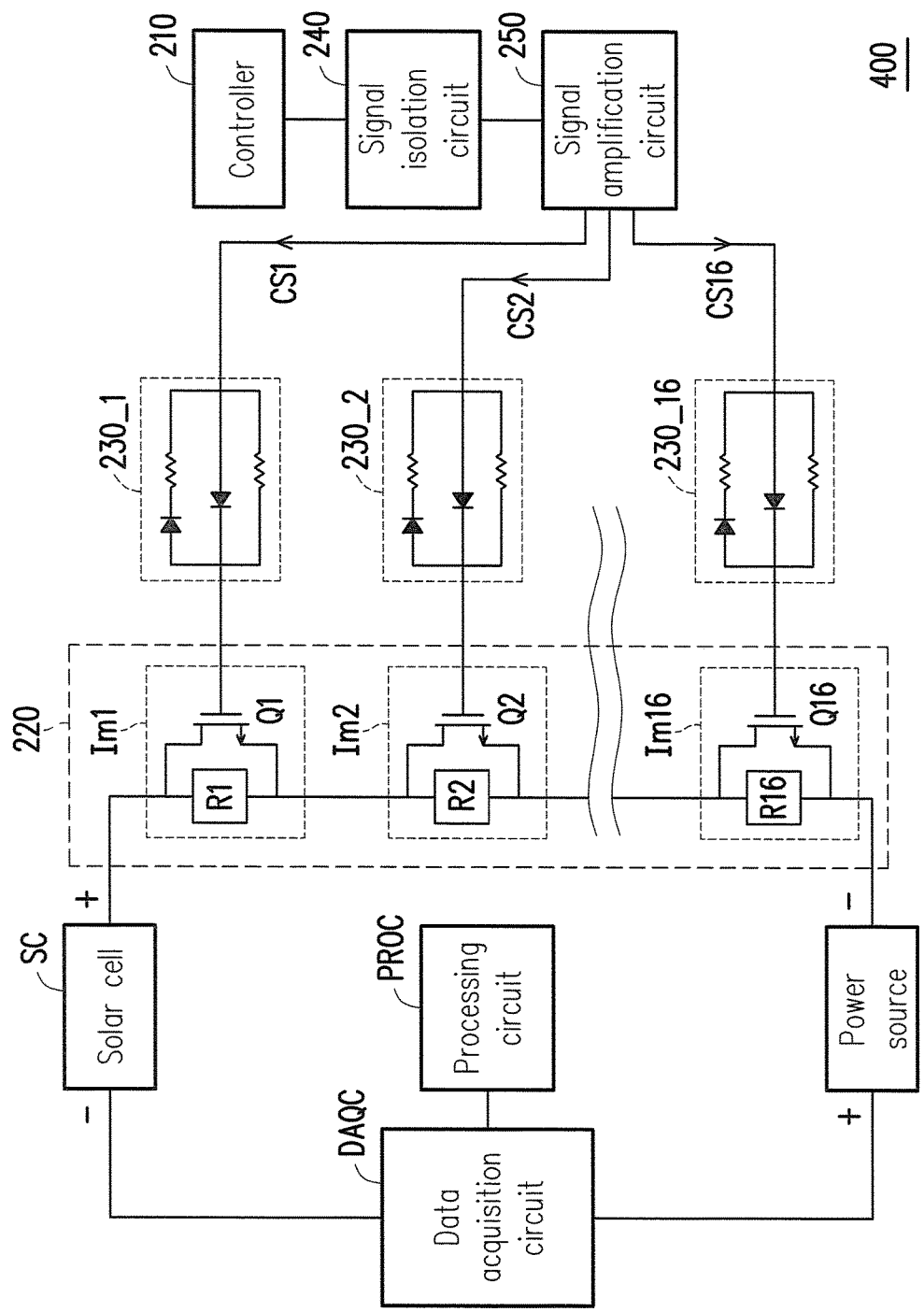
FIG. 4 is a block circuit diagram of a measuring apparatus for solar cell according to an embodiment of the disclosure.

FIG. 4 is a block circuit diagram of a measuring apparatus for solar cell according to an embodiment of the disclosure. Referring to FIG. 2 to FIG. 4, the path separating circuit 230_1 to 230_16 of the embodiment of FIG. 2 are all implemented by the path separating circuit 230_1 of the embodiment of FIG. 3, and the measuring apparatus 200 is electrically connected to a data acquisition circuit DAQC and a processing circuit PROC to implement the measuring apparatus 400 of FIG. 4. In an embodiment, the data acquisition circuit DAQC is configured to obtain a plurality of characteristic curves of the solar cell SC, and the processing circuit PROC is configured to fit the plurality of characteristic curves obtained by the data acquisition circuit DAQC into an optimal characteristic curve.

In the present embodiment, the data acquisition circuit DAQC is electrically connected to the solar cell SC and the resistance circuit 220, and the processing circuit PROC is coupled to the data acquisition circuit DAQC. In the present embodiment, during the measurement, a power source is further connected to the resistance circuit 220 and the solar cell SC. When the controller 210 outputs the control signals CS1 to CS16 of different combinations, the resistance circuit 220 respectively determines whether to provide the measurement loadings through the resistors R1 to R16 according to the control signals CS1 to CS16. According to one measurement loading, the data acquisition circuit DAQC may obtain one data point (for example, an I-V data point) corresponding to the solar cell SC. According to a plurality of incremental or decremental measurement loading, the data acquisition circuit DAQC may obtain one characteristic curve (for example, an I-V characteristic curve) of the solar cell SC.

For example, the controller 210 may output a set of control signals CS1 to CS16 with a forward-sweep bias to change the combination of the resistors R1 to R16 for providing the measurement loadings in a specific frequency, such that the measurement loadings of the resistance circuit 220 are progressively increased in the specific frequency. In this way, the data acquisition circuit DAQC may obtain a plurality of data points corresponding to the incremental measurement loads, so as to obtain a forward-sweep characteristic curve of the solar cell SC.

On the other hand, the controller 210 may output another set of control signals CS1 to CS16 with a backward-sweep bias to change the combination of the resistors R1 to R16 for providing the measurement loadings in a specific frequency, such that the measurement loadings of the resistance circuit 220 are progressively decreased in the specific frequency. In this way, the data acquisition circuit DAQC may obtain a plurality of data points corresponding to the decremental measurement loads, so as to obtain a backward-sweep characteristic curve of the solar cell SC.

Figure 5:
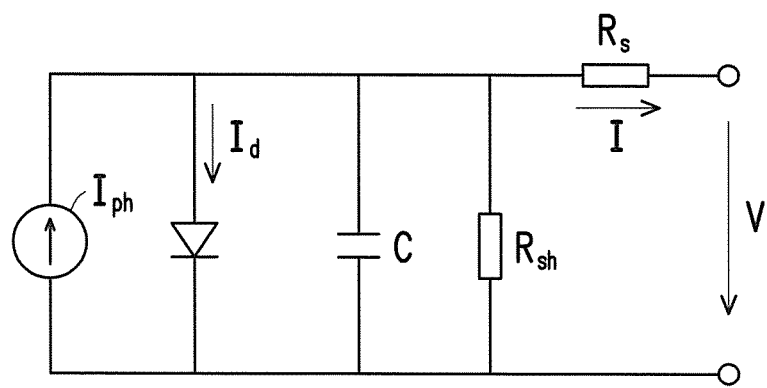
FIG. 5 is an equivalent circuit diagram of a solar cell according to an embodiment of the disclosure.

FIG. 5 is an equivalent circuit diagram of a solar cell according to an embodiment of the disclosure. Generally, when the solar cell without an inbuilt capacitor is measured, the forward-sweep characteristic curve is almost the same to the backward-sweep characteristic curve. When the solar cell has a inbuilt capacitor C, the capacitor C is regarded to be connected in parallel in the equivalent circuit, as that shown in FIG. 5, where I is an output current, V is an output voltage, $I_{ph}$ is a photo-converted current, $R_s$ is a series resistance, $R_{sh}$ is a shunt resistance, $I_d$ is a dark current, and C is the inbuilt capacitance. Since those skilled in the art may learn enough instructions and recommendations for detail description of each of the parameters in the equivalent circuit of FIG. 5 from general knowledge of the field, detail thereof is not repeated.

Influenced by the aforementioned inbuilt capacitance C, the forward-sweep characteristic curve of the solar cell SC is projected upward at a point close to the maximum-power-point, and the backward-sweep characteristic curve of the solar cell SC is bended downward at the point close to the maximum-power-point. In other words, due to the inbuilt capacitor, there is a great error when using the measured characteristic curve to determine the maximum-power-point.

Therefore, in the present embodiment, after the data acquisition circuit DAQC obtains the forward-sweep characteristic curve and the backward-sweep characteristic curve of the solar cell SC, the processing circuit PROC fits the forward-sweep characteristic curve and the backward-sweep characteristic curve into the optimal characteristic curve.

Figure 6:
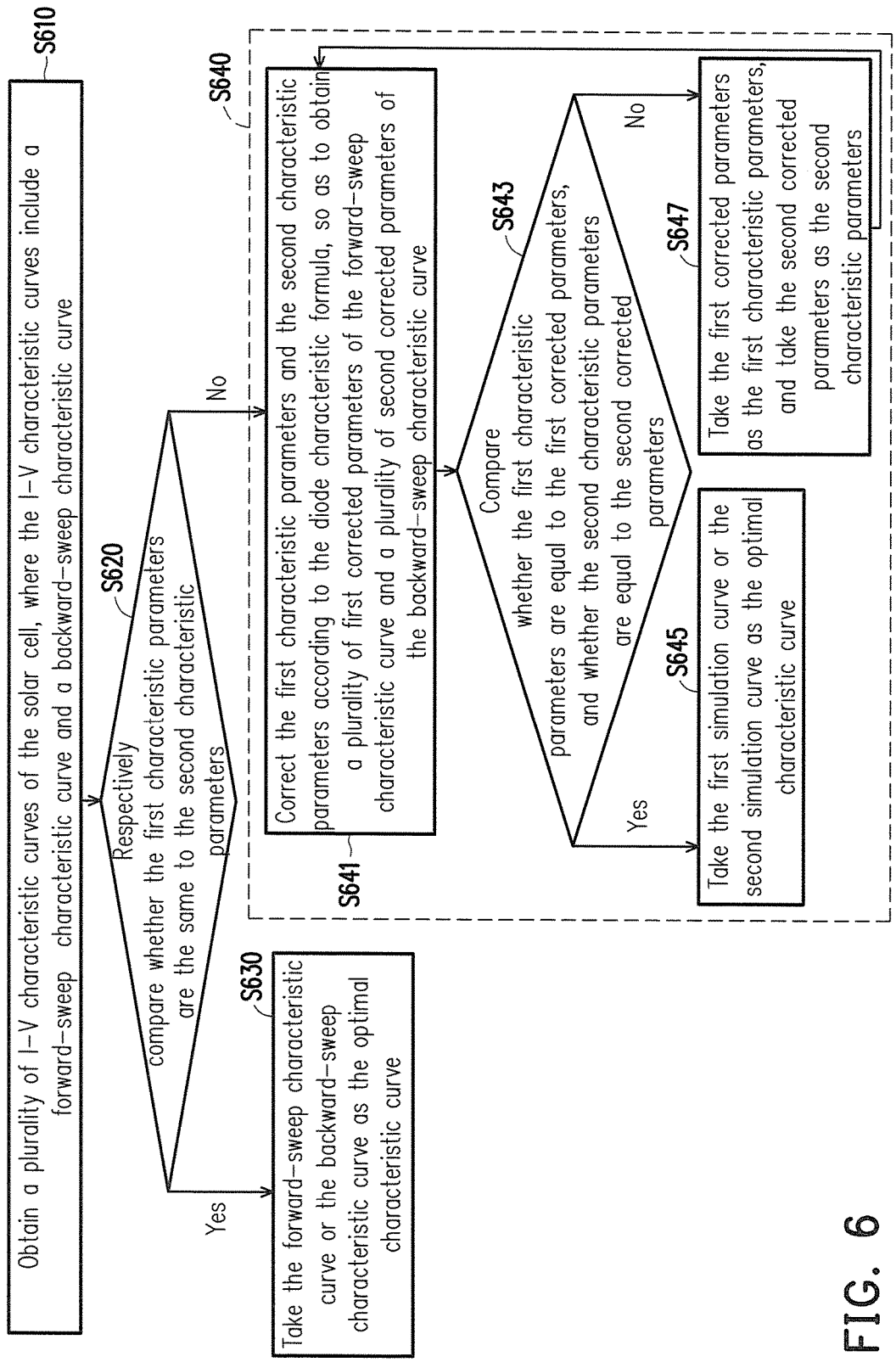
FIG. 6 is a flowchart illustrating a method for fitting characteristic curves according to an embodiment of the disclosure.
Figure 7:
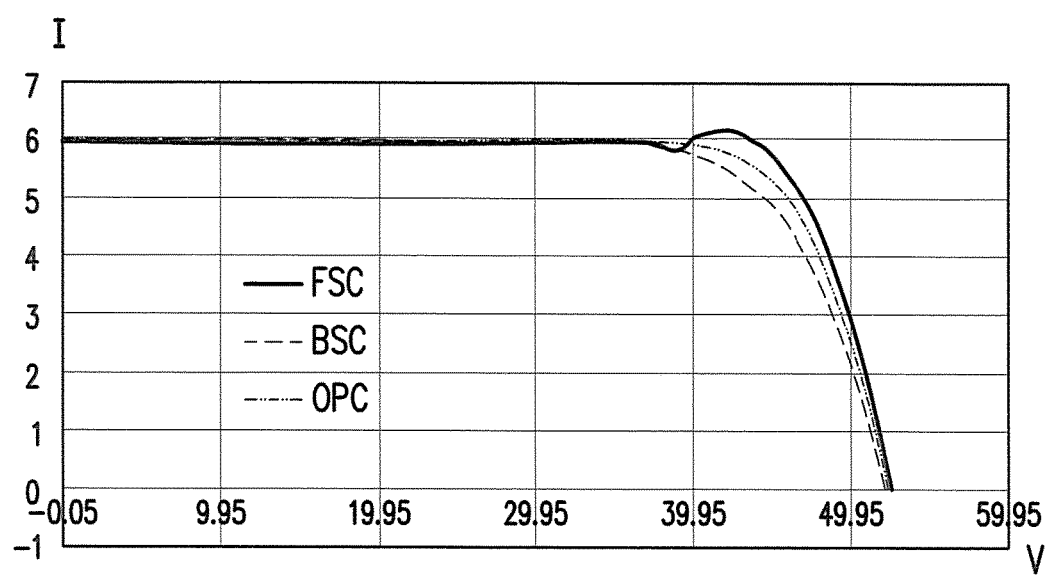
FIG. 7 is a schematic diagram of an I-V characteristic curve according to an embodiment of the disclosure.

FIG. 6 is a flowchart illustrating a method for fitting the characteristic curves according to an embodiment of the disclosure. FIG. 7 is a schematic diagram of an I-V characteristic curve according to an embodiment of the disclosure. The method for fitting the characteristic curves of the present embodiment is adapted to the measure apparatus 400 of FIG. 4, and the steps of the method for fitting the characteristic curves of the present embodiment are described below with reference of the various components of the measuring apparatus 400.

Referring to FIG. 4, FIG. 6 and FIG. 7, in step S610, the processing circuit PROC obtains a plurality of I-V characteristic curves of the solar cell SC from the data acquisition circuit DAQC, and the I-V characteristic curves include a forward-sweep characteristic curve FSC and a backward-sweep characteristic curve BSC.

Generally, an intersection of the I-V characteristic curve and a current axis is a short circuit current, and an intersection of the I-V characteristic curve and a voltage axis is an open circuit voltage, a series resistance can be obtained according to a slope of the intersection (i.e. the open circuit voltage) of the I-V characteristic curve and the voltage axis, and a shunt resistance can be obtained according to a negative reciprocal of a slope of the intersection (i.e. the short circuit current) of the I-V characteristic curve and the current axis.

Therefore, the processing circuit PROC may obtain a plurality of first characteristic parameters of the forward-sweep characteristic curve FSC from the obtained forward-sweep characteristic curve FSC, where the first characteristic parameters include a series resistance Rs1, a shunt resistance Rsh1, a short circuit current Ioc1 and an open circuit voltage Voc1, and the processing circuit PROC may obtain a plurality of second characteristic parameters of the backward-sweep characteristic curve BSC from the obtained backward-sweep characteristic curve BSC, where the second characteristic parameters include a series resistance Rs2, a shunt resistance Rsh2, a short circuit current Ioc2 and an open circuit voltage Voc2.

Then, in step S620, the processing circuit PROC respectively determines whether the first characteristic parameters are the same to the second characteristic parameters. To be specific, the processing circuit PROC determines whether a difference between the series resistance Rs1 and the series resistance Rs2 is smaller than a tolerance value. If yes, the series resistance Rs1 and the series resistance Rs2 are regarded to be equivalent. Methods for the processing circuit PROC compares the other characteristic parameters can be deduced by analogy. It should be noted that when the characteristic parameters are compared, the tolerance values set by the processing circuit PROC can be the same or different, and those skilled in the art may adjust the tolerance values according to an actual requirement.

If each of the first characteristic parameters is respectively equal to each of the second characteristic parameters, it represents that an error between the forward-sweep characteristic curve FSC and the backward-sweep characteristic curve BSC is rather small or the two curves are almost the same. In this way, in step S630, the processing circuit PROC takes the forward-sweep characteristic curve FSC or the backward-sweep characteristic curve BSC as the optimal characteristic curve.

On the other hand, if the first characteristic parameters are not equal to the second characteristic parameters, a step S640 is executed, by which the processing circuit PROC corrects the first characteristic parameters in iteration according to a diode characteristic formula, so as to obtain the optimal characteristic curve.

In detail, the solar cell without the inbuilt capacitor is generally equivalent to a p-n diode, and a measured current-voltage relation can be represented by a following diode characteristic formula:

$$I = I_{ph} - I_0 [e^{\frac{q(V+IR_s)}{AkT}} - 1] - \frac{(V+IR_s)}{R_{sh}}$$

Where, I is an output current, V is an output voltage, $I_{ph}$ is a photo-converted current, $R_s$ is a series resistance, $R_{sh}$ is a shunt resistance, A is a p-n interface constant, $I_0$ is a p-n reverse saturation current, q is a charge quantity, k is a Bozeman constant, and T is a temperature. Since those skilled in the art may learn enough instructions and recommendations for detail description of each of the parameters from general knowledge of the field, detail thereof is not repeated.

If the aforementioned equation is spread by using a power series, the diode characteristic formula can be presented as a following polynomial curve equation:

$$f(V)=a_0+a_1V+a_2V^2+ \ldots +a_nV^n$$

Where, the output current I can be represented as a function $f(V)$ of the output voltage V, and $a_0$-$a_n$ are coefficients of power series spreading. By using the aforementioned polynomial curve equation, the processing circuit PROC may correct the first characteristic parameters and the second characteristic parameters in iteration to obtain the optimal characteristic curve.

In detail, the processing circuit PROC takes a power of the polynomial curve equation to serve as a basis for correcting the first characteristic parameters and the second characteristic parameters in iteration. For example, at a first iteration, the processing circuit PROC corrects the first characteristic parameters and the second characteristic parameters according to $f(V)=a_0+a_1V$; and at a second iteration, the processing circuit PROC corrects the first characteristic parameters and the second characteristic parameters according to $f(V)=a_0+a_1V+a_2V^2$, and the others are deduced by analogy. Steps that the processing circuit PROC corrects the first characteristic parameters and the second characteristic parameters in iteration are described below.

In the present embodiment, the step S640 of iterative correction further includes steps S641 to S647. In the step S641, the processing circuit PROC corrects the first characteristic parameters and the second characteristic parameters according to the diode characteristic formula, so as to obtain a plurality of first corrected parameters of the forward-sweep characteristic curve and a plurality of second corrected parameters of the backward-sweep characteristic curve, where the first corrected parameters correspond to a first simulation curve, and the second corrected parameters correspond to a second simulation curve.

In detail, the processing circuit PROC may correct the first characteristic parameters by using the spread diode characteristic formula according to the method described in the preceding paragraph, and simulates the first simulation curve. According to the method described in the preceding paragraph, the processing circuit PROC may obtain a plurality of the first corrected parameters corresponding to the first simulation curve, where the first corrected parameters at least include a series resistance Rs1' and a shunt resistance Rsh1'. On the other hand, the processing circuit PROC may simulate the second simulation curve in the similar manner, and obtain a plurality of second corrected parameters, where the second corrected parameters at least include a series resistance Rs2' and a shunt resistance Rsh2'.

Then, in step S643, the processing circuit PROC compares whether the first characteristic parameters are equal to the first corrected parameters, and whether the second characteristic parameters are equal to the second corrected parameters.

In detail, the processing circuit PROC determines whether a difference between the series resistance Rs1 and the series resistance Rs1' is smaller than a first tolerance value. If yes, the processing circuit PROC determines that the series resistance Rs1 is equal to the series resistance Rs1'. The processing circuit PROC also determines whether a difference between the shunt resistance Rsh1 and the shunt resistance Rsh1' is smaller than a second tolerance value. If yes, the processing circuit PROC determines that the shunt resistance Rsh1 is equal to the shunt resistance Rsh1'.

On the other hand, the processing circuit PROC determines whether a difference between the series resistance Rs2 and the series resistance Rs2' is smaller than the first tolerance value. If yes, the processing circuit PROC determines that the series resistance Rs2 is equal to the series resistance Rs2'. The processing circuit PROC also determines whether a difference between the shunt resistance Rsh2 and the shunt resistance Rsh2' is smaller than a second tolerance value. If yes, the processing circuit PROC determines that the shunt resistance Rsh2 is equal to the shunt resistance Rsh2'.

It should be noted that the first tolerance value and the second tolerance value can be the same or different, which is not limited by the disclosure.

Moreover, in the present embodiment, whether two parameters are equivalent is determined according to whether a difference between the parameters is smaller than a tolerance value. However, the detailed implementation for determining whether two parameters are equivalent is not limited by the disclosure.

In another embodiment, the processing circuit PROC may calculate a quotient of the series resistance Rs1 and the series resistance Rs1', and determines whether a difference between the quotient and 1 is smaller than a third tolerance value. If yes, it is determined that the series resistance Rs1 is equal to the series resistance Rs1'. The processing circuit PROC may also calculate a quotient of the shunt resistance Rsh1 and the shunt resistance Rsh1', and determines whether a difference between the quotient and 1 is smaller than a fourth tolerance value. If yes, it is determined that the shunt resistance Rsh1 is equal to the shunt resistance Rsh1'.

On the other hand, the processing circuit PROC may calculate a quotient of the series resistance Rs2 and the series resistance Rs2', and determines whether a difference between the quotient and 1 is smaller than the third tolerance value. If yes, it is determined that the series resistance Rs2 is equal to the series resistance Rs2'. The processing circuit PROC may also calculate a quotient of the shunt resistance Rsh2 and the shunt resistance Rsh2', and determines whether a difference between the quotient and 1 is smaller than the fourth tolerance value. If yes, it is determined that the shunt resistance Rsh2 is equal to the shunt resistance Rsh2'.

If the first characteristic parameters are equal to the first corrected parameters, and the second characteristic parameters are equal to the second corrected parameters, it represents that the iterative correction is completed, and a step S645 is executed, by which the processing unit PROC takes the first simulation curve or the second simulation curve as the optimal characteristic curve. In the present embodiment, if the series resistance Rs1 is equal to the series resistance Rs1', the shunt resistance Rsh1 is equal to the shunt resistance Rsh1', the series resistance Rs2 is equal to the series resistance Rs2', and the shunt resistance Rsh2 is equal to the shunt resistance Rsh2', it represents that the iterative correction is completed.

On the other hand, if the first characteristic parameters are equal to the first corrected parameters, or the second characteristic parameters are equal to the second corrected parameters, a step S647 is executed, by which the processing circuit PROC takes the first corrected parameters as the first characteristic parameters, and takes the second corrected parameters as the second characteristic parameters. Then, in step S641, the processing unit PROC again corrects the first characteristic parameters and the second characteristic parameters according to the diode characteristic formula until the optimal characteristic curve is obtained.

As shown in FIG. 7, after the processing PROC corrects the first characteristic parameters and the second characteristic parameters in iteration, the forward-sweep characteristic curve FSC and the backward-sweep characteristic curve BSC are fit into an optimal characteristic curve OPC. In this way, the accurate I-V characteristic curve (i.e. the optimal characteristic curve OPC) of the solar cell SC is obtained, so as to accurately determine a position of the maximum-power-point.

In summary, the measuring apparatus for solar cell of the disclosure outputs the control signal to the resistance circuit by using the signal transmitting control circuit, and separates a charging and discharging path of the control signal by using the path separating circuit during the process of transmitting the control signal. In this way, the measurement loadings provided by the resistance circuit can be quickly switched, and an oscillation effect caused by factors of an inbuilt capacitance of the component, etc., during the switching operation is avoided, so as to quickly and accurately capture the characteristic curve of the solar cell. On the other hand, when the measured solar cell has the inbuilt capacitance to cause a measurement error, the measuring apparatus for the solar cell of the disclosure may fit the forward-sweep characteristic curve and the backward-sweep characteristic curve into the optical characteristic curve by using the iteration correction method. In this way, the I-V characteristic curve not containing the capacitance effect is obtained through correction, and the position of the maximum-power-point is obtained, so as to perform more accurate analysis to the measured solar cell.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A measuring apparatus for solar cells, configured to measure a solar cell to obtain a characteristic curve thereof, the measuring apparatus for the solar cell comprising:
    a signal measurement control circuit, comprising a controller and a resistance circuit, the controller being configured to output at least one control signal for controlling the resistance circuit to provide a measurement loading;
    a signal transmitting control circuit, electrically connected between the the controller and the resistance circuit, wherein the signal transmitting control circuit comprises at least one path separating circuit, each path separating circuit is configured to provide at least two signal transmitting paths, and signal transmitting directions of the at least two signal transmitting paths are different;
    a data acquisition circuit, electrically connected to the solar cell and the resistance circuit, and configured to obtain a plurality of characteristic curves of the solar cell; and
    a processing circuit, coupled to the data acquisition circuit, and configured to fit the characteristic curves into an optimal characteristic curve,
    wherein the controller is configured to output the at least one control signal to the resistance circuit by using the signal transmitting control circuit,
    wherein the characteristic curves comprise a forward-sweep characteristic curve and a backward-sweep characteristic curve, the forward-sweep characteristic curve comprises a plurality of first characteristic parameters, and the backward-sweep characteristic curve comprises a plurality of second characteristic parameters,
    wherein the processing circuit is configured to respectively determine whether the first characteristic parameters are the same to the second characteristic parameters,
    wherein when the first characteristic parameters are the same to the second characteristic parameters, the processing circuit takes the forward-sweep characteristic curve or the backward-sweep characteristic curve as the optimal characteristic curve,
    wherein when the first characteristic parameters are not the same to the second characteristic parameters, the processing circuit corrects the first characteristic parameters and the second characteristic parameters in iteration according to a diode characteristic formula, so as to obtain the optimal characteristic curve.

2. The measuring apparatus for solar cell as claimed in claim 1, wherein the path separating circuit provides a first signal transmitting path and a second signal transmitting path, wherein a current flows into the resistance circuit through the first signal transmitting path, and flows out of the resistance circuit through the second signal transmitting path.

3. The measuring apparatus for solar cell as claimed in claim 2, wherein an impedance of the first signal transmitting path is smaller than an impedance of the second signal transmitting path.

4. The measuring apparatus for solar cell as claimed in claim 2, wherein the first signal transmitting path and the second signal transmitting path are connected in parallel.

5. The measuring apparatus for solar cell as claimed in claim 2, wherein the first signal transmitting path and the second signal transmitting path are not connected in parallel.

6. The measuring apparatus for solar cell as claimed in claim 2, wherein the first signal transmitting circuit comprises a first diode, the second signal transmitting circuit comprises a second diode and a first resistor, and the resistance circuit is electrically connected to an output terminal of the first diode and an input terminal of the second diode.

7. The measuring apparatus for solar cell as claimed in claim 6, wherein the path separating circuit further comprises a third signal transmitting path, wherein a current flows out of the resistance circuit through the second signal transmitting path and the third signal transmitting path.

8. The measuring apparatus for solar cell as claimed in claim 7, wherein the third signal transmitting path comprises a second resistor, and an impedance of the third signal transmitting path is greater than an impedance of the first signal transmitting path and an impedance of the second signal transmitting path.

9. The measuring apparatus for solar cell as claimed in claim 1, wherein the resistance circuit comprises at least one control terminal, and the at least one control terminal is electrically connected to the signal transmitting control circuit.

10. The measuring apparatus for solar cell as claimed in claim 1, wherein the resistance circuit comprises at least one impedance circuit, wherein each of the impedance circuit comprises:

a resistor; and a transistor switch, connected to the resistor in parallel, wherein a control terminal of the transistor switch is electrically connected to the signal transmitting control circuit, and the transistor switch determines whether to provide the measurement loading through the resistor according to one of the at least one control signal.

11. The measuring apparatus for solar cell as claimed in claim 10, wherein the at least one impedance circuit one-to-one corresponds to the at least one path separating circuit.

12. The measuring apparatus for solar cell as claimed in claim 1, wherein the signal measurement control circuit further comprises:

a signal amplification circuit, electrically connected to the controller, and configured to amplify the at least one control signal output by the controller.

13. The measuring apparatus for solar cell as claimed in claim 1, wherein the signal measurement control circuit further comprises:

a signal isolation circuit, electrically connected between the controller and the signal transmitting control circuit, and configured to respectively transmitting the at least one control signal to the at least one path separating circuit.

14. The measuring apparatus for solar cell as claimed in claim 13, wherein the signal isolation circuit is further configured to isolate a reverse current flowing from the signal transmitting control circuit to the controller.

15. The measuring apparatus for solar cell as claimed in claim 1, wherein when the processing circuit corrects the first characteristic parameters and the second characteristic parameters in iteration according to the diode characteristic formula, the processing circuit corrects the first characteristic parameters and the second characteristic parameters according to the diode characteristic formula, so as to obtain a plurality of first corrected parameters of the forward-sweep characteristic curve and a plurality of second corrected parameters of the backward-sweep characteristic curve, wherein the first corrected parameters correspond to a first simulation curve, and the second corrected parameters correspond to a second simulation curve, wherein the processing circuit further determines whether the first characteristic parameters are the same to the first corrected parameters, and whether the second characteristic parameters are the same to the second corrected parameters, wherein when the first characteristic parameters are the same to the first corrected parameters, and when the second characteristic parameters are the same to the second corrected parameters, the processing circuit takes the first simulation curve or the second simulation curve as the optimal characteristic curve.

16. The measuring apparatus for solar cell as claimed in claim 15, wherein when the first characteristic parameters are not the same to the first corrected parameters, or the second characteristic parameters are not the same to the second corrected parameters, the processing circuit takes the first corrected parameters as the first characteristic parameters, and takes the second corrected parameters as the second characteristic parameters, and corrects the first characteristic parameters and the second characteristic parameters in iteration according to the diode characteristic formula.

17. The measuring apparatus for solar cell as claimed in claim 1, wherein the diode characteristic formula presents a polynomial curve equation after being spread by using a power series, when the processing circuit corrects the first characteristic parameters and the second characteristic parameters in iteration, the processing circuit corrects the first characteristic parameters and the second characteristic parameters in iteration according to a power of the polynomial curve equation.

\* \* \* \* \*